US009780863B2

(12) United States Patent
Lotter

(10) Patent No.: US 9,780,863 B2
(45) Date of Patent: Oct. 3, 2017

(54) SYSTEM AND METHOD FOR SELECTING AN OPERATOR TO BOOST IN A REPEATER

(71) Applicant: Nextivity, Inc., San Diego, CA (US)

(72) Inventor: Michiel Petrus Lotter, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 0 days.

(21) Appl. No.: 14/935,284

(22) Filed: Nov. 6, 2015

(65) Prior Publication Data
US 2016/0134355 A1 May 12, 2016

Related U.S. Application Data

(60) Provisional application No. 62/077,045, filed on Nov. 7, 2014.

(51) Int. Cl.
H04B 7/15 (2006.01)
H04B 7/14 (2006.01)
H04B 7/155 (2006.01)
H04W 16/26 (2009.01)

(52) U.S. Cl.
CPC ........... H04B 7/14 (2013.01); H04B 7/15507 (2013.01); H04B 7/15542 (2013.01); H04W 16/26 (2013.01)

(58) Field of Classification Search
CPC .............. H04B 7/155; H04B 7/15507; H04B 7/15514; H04B 7/2606; H04B 7/026; H04B 7/14; H04B 7/15542; H04W 16/26; H04W 88/04; H04W 84/047

USPC ..... 455/3.02, 427, 428, 430, 431, 7–9, 11.1, 455/12.1, 13.1, 13.2, 14–17; 370/226, 370/293, 246, 274, 279, 315, 316, 492, 370/501
See application file for complete search history.

(56) References Cited

U.S. PATENT DOCUMENTS

| | | | | |
|---|---|---|---|---|
| 5,347,646 A | * | 9/1994 | Hirosawa | G06F 9/4843 379/102.01 |
| 5,987,304 A | * | 11/1999 | Latt | H04B 7/15528 455/17 |
| 7,752,259 B2 | * | 7/2010 | Weiser | H04L 12/1895 455/404.1 |
| 2002/0028669 A1 | * | 3/2002 | Rhawi | H04M 15/00 455/406 |
| 2006/0019604 A1 | | 1/2006 | Hasarchi | |
| 2007/0275717 A1 | * | 11/2007 | Edge | H04W 48/16 455/434 |
| 2008/0064354 A1 | * | 3/2008 | Lee | H04B 7/15535 455/187.1 |
| 2008/0250053 A1 | * | 10/2008 | Aaltonen | G06Q 30/08 |

(Continued)

FOREIGN PATENT DOCUMENTS

EP 1109332 A2 6/2001

Primary Examiner — Dominic Rego
(74) Attorney, Agent, or Firm — Mintz Levin Cohn Ferris Glovsky and Popeo, P.C.

(57) ABSTRACT

A system and method for selecting an operator to boost in a repeater are disclosed. Wireless signals are received at a wireless signal booster from two or more mobile phone operators. One selected operator is selected from the two or more mobile phone operators. The wireless signals from the selected operator are then selectively boosted, the selectively boosting repeating the wireless signals from the selected operator in a boosted state for a mobile phone recipient.

20 Claims, 6 Drawing Sheets

(56) References Cited

U.S. PATENT DOCUMENTS

| | | | |
|---|---|---|---|
| 2009/0318224 A1* | 12/2009 | Ealey | A63F 13/005 463/31 |
| 2011/0112701 A1* | 5/2011 | Johnson | G01D 4/002 700/295 |
| 2011/0188913 A1* | 8/2011 | Aoi | G03G 15/23 399/388 |
| 2012/0157040 A1* | 6/2012 | Naito | H04L 12/1428 455/406 |
| 2013/0007186 A1* | 1/2013 | Liu | H04L 67/1008 709/213 |
| 2014/0141763 A1* | 5/2014 | Suh | H04W 4/001 455/418 |

\* cited by examiner

SYSTEM AND METHOD FOR SELECTING AN OPERATOR TO BOOST IN A REPEATER

CROSS-REFERENCE TO RELATED APPLICATION

This application claims priority under 35 U.S.C. §119(e) to Provisional Application Ser. No. 62/077,045, filed Nov. 7, 2014, and titled "SYSTEM AND METHOD FOR SELECTING AN OPERATOR TO BOOST IN A REPEATER," the disclosures of which are hereby incorporated by reference herein.

BACKGROUND

Wireless repeaters can be divided into two broad classes: namely Wideband Boosters that boost the signal from more than one mobile phone operator at any point in time through the use of a broadband amplifier; and Provider Specific Signal Boosters (also known as channel select repeaters) that filter out the signal of a specific mobile operator and boost only that signal.

For the case of Provider Specific Signal Boosters, the selection of which operator's signal to boost can be made in a number of different ways, and the focus of this disclosure is a variety of new ways in which this selection can be made. Typically, Provider Specific or Channel Select boosters can be re-programmed to boost the signal of a different mobile phone operator to the one that is currently assigned. Normally, this is done by connecting a computer to the repeater via an interface such as a USB interface, and downloading new software to the booster. Typically, a special software release is provided by the repeater vendor and the user can then program the repeater with this special software version.

SUMMARY

In this disclosure, a number of alternative systems and methods to change the configuration of the booster are described, each being tailored to a specific use case or cases.

In some implementations, a system is provided that includes a booster that includes a controller for implementing a configuration associated with an operator on the booster, and a list of one or more available operators. In the system, upon selection by a user of one of the one or more available operators, the configuration associated with the user selected operator is transferred to the controller.

In other related implementations, a system is provided that includes a booster with a controller for implementing a configuration associated with an operator on the booster and an external device that sends operator information to the controller.

Further related implementations provide a method that includes receiving, at a wireless signal booster, wireless signals from two or more mobile phone operators; selecting one selected operator from the two or more mobile phone operators; and selectively boosting, by the wireless signal booster, the wireless signals from the selected operator, the selectively boosting repeating the wireless signals from the selected operator in a boosted state for a mobile phone recipient.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a number of alternative methods to change the configuration of a booster, each focused on specific use cases.

In accordance with a first set of implementations, the operator's signal to be boosted can be selected from a list of available operators. In this first set of implementations, the system presents a user with a list of operator names that constitute the available configurations to which the Provider Specific Booster can be reconfigured. The user then selects an operator name and this information is then used to automatically configure the booster correctly for operation on the selected operator's network.

Figure 1:
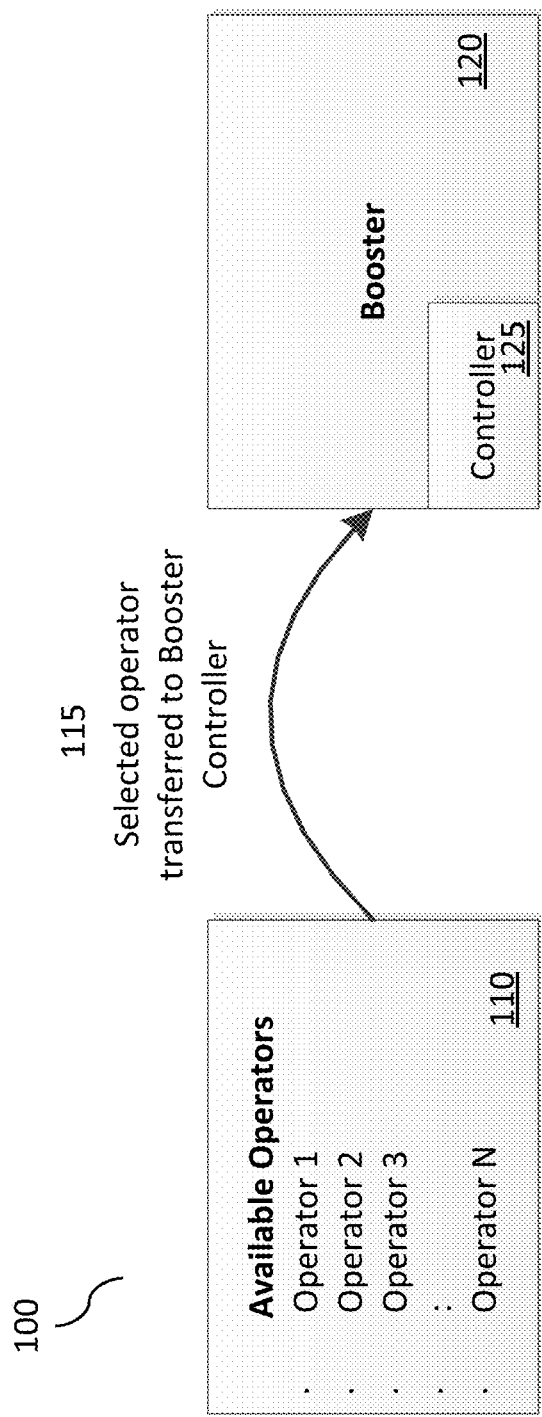
FIG. 1 illustrates a method for a booster for selecting an operator by name from a list of available operators to the booster, in accordance with implementations described herein.

FIG. 1 illustrates a system and method 100, in accordance with some implementations, where the user is presented with a list of potential operators 110 the booster 120 can be configured for, as opposed to receiving a configuration file for a specific operator. This list 110 may be presented to the user in many different formats such as a display on the booster 120, a list on an application running on a handset connected to the booster 120 or a website to which a software application is connected. Once the user selects an operator from the list of potential operators 110, the name of the selected operator and associated configuration information can be transferred 115 to a controller 125 on the booster 120. The controller 125 uses the information associated with the selected operator to configure the booster 120 appropriately.

Figure 2:
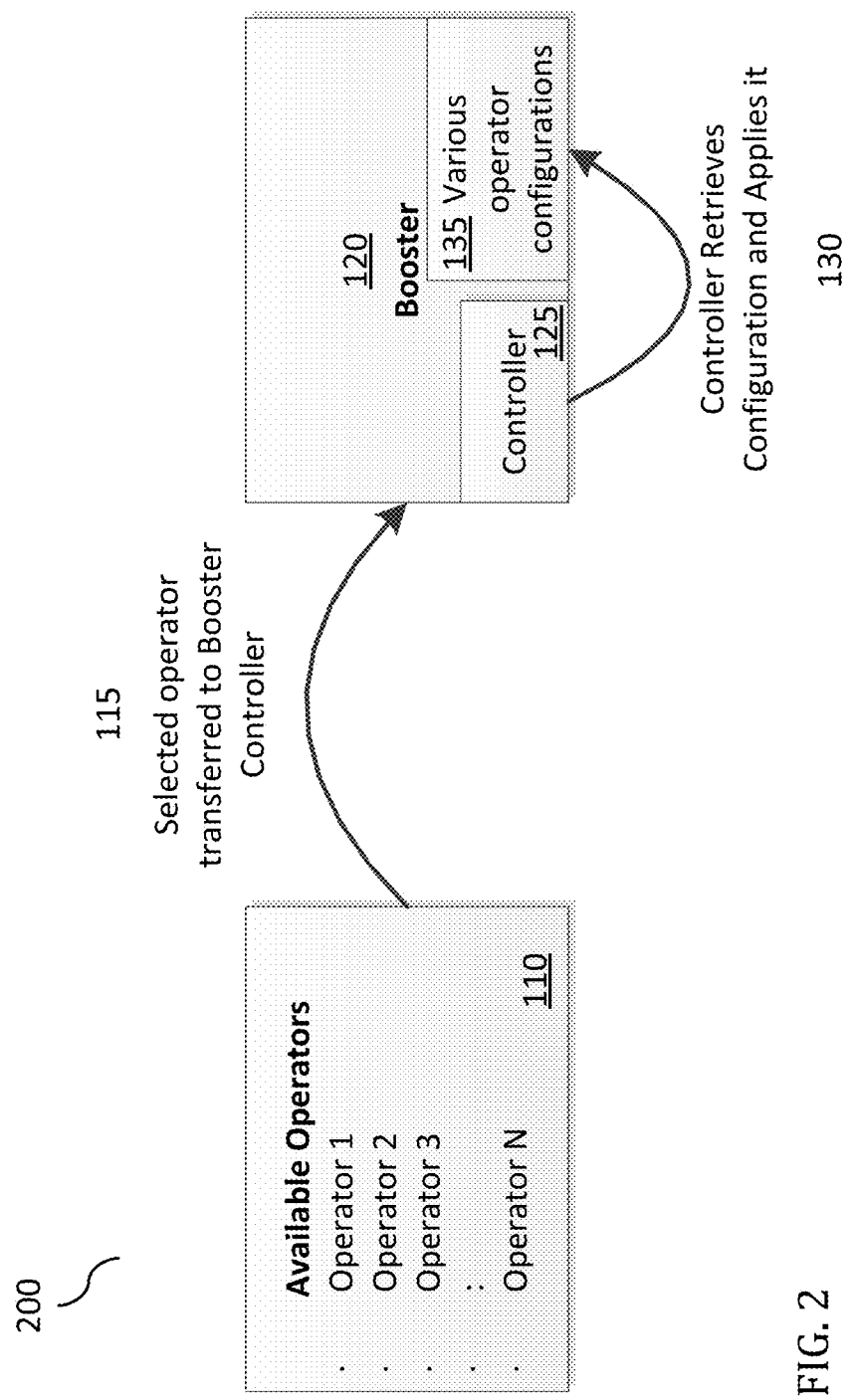
FIG. 2 illustrates retrieving locally stored configuration information, in accordance with implementations described herein.

FIG. 2 illustrates a system and method 200 where the list of available operator names 110 and associated configuration files 135 are stored locally on the booster 120. Initially, a user is presented with the list of available operators 110 on an interface on the booster 120, a list on an application running on a handset connected to the booster 120 or a website to which a software application is connected. Once the user selects an operator whose signal will be boosted and this selection is sent 115 to the controller 125 on the booster 120, the controller 125 retrieves 130 the corresponding configuration information from a database of operator configurations 135 that is stored on the booster 120. The controller 125 implements the configuration corresponding to the selected operator so that the operator's signal is appropriately boosted.

Figure 3:
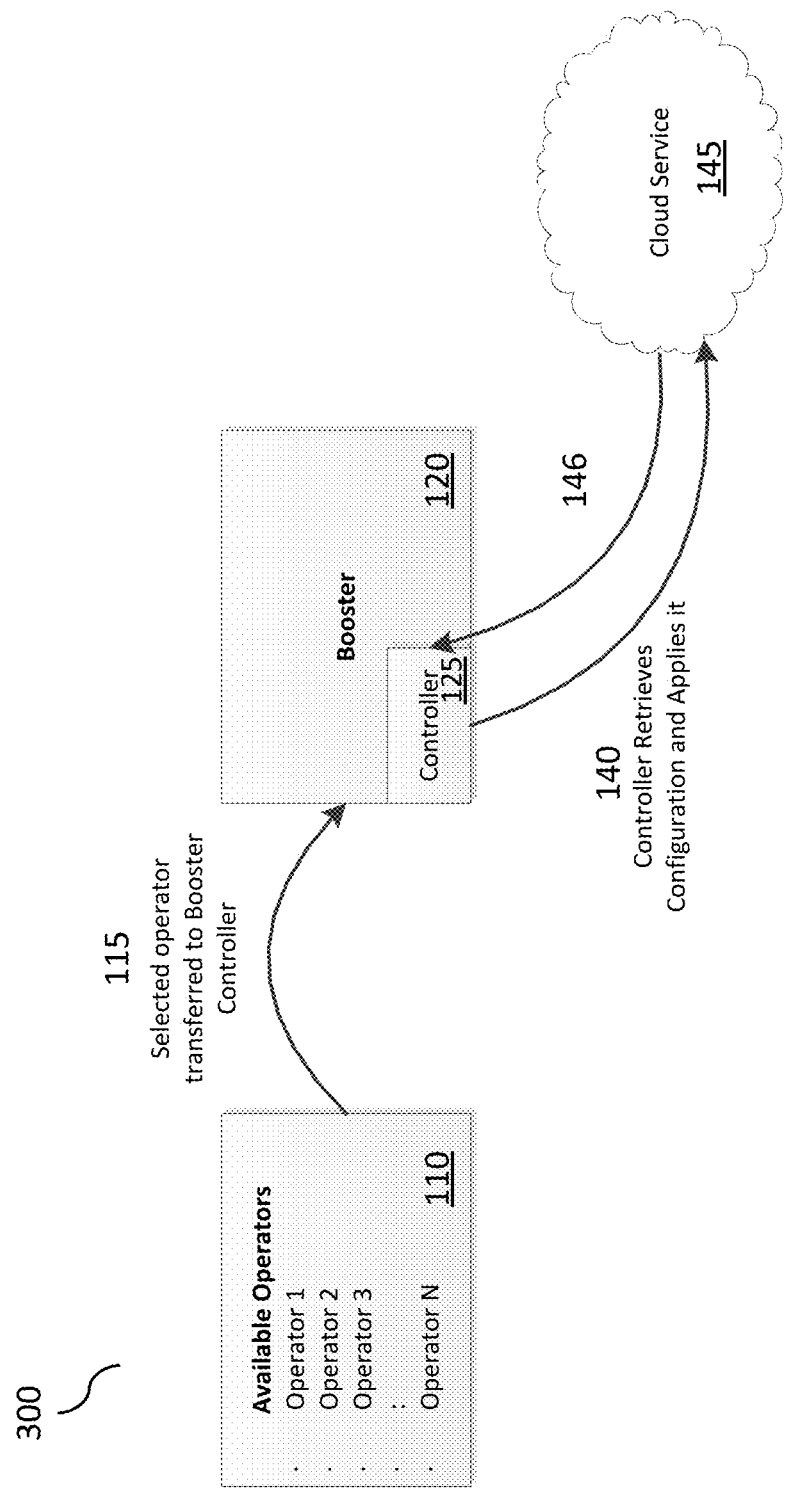
FIG. 3 illustrates retrieving remotely stored operator configurations, in accordance with implementations described herein.

FIG. 3 illustrates a system and method 300 where the list of available operator names 110 and associated configuration files is stored outside the booster 120, for example on a computer that can be connected to the booster for reconfiguration or in a storage cloud 145 from where the configurations can be retrieved. A user is presented with the list of available operators 110 on an interface on the booster 120, a list on an application running on a handset connected to the booster 120 or a website to which a software application is connected. Once the user selects an operator whose signal will be boosted and this selection is sent 115 to the controller 125 on the booster 120, the controller 125 retrieves 140 configuration information for the selected operator. This configuration information can be obtained from a database or other compilation of configuration information that resides in computational cloud 145. The computational cloud 145 can provide the information 146 to the controller 125 on the booster 120. The controller 125 in turn causes the booster 120 to conform to the configuration corresponding to the selected operator.

In accordance with a second set of implementations, the operator's signal to be boosted is retrieved from a device connected to the booster. In this second set of implementations, the name of the operator that the booster is to be configured for is retrieved from a device connected to the booster. For example, a cellular phone can be connected to the booster using a technology such as Bluetooth or Bluetooth LE. Using this connection, the booster can retrieve the name of the network the phone is connected to from the phone and configure itself to boost this operator's network.

Figure 4:
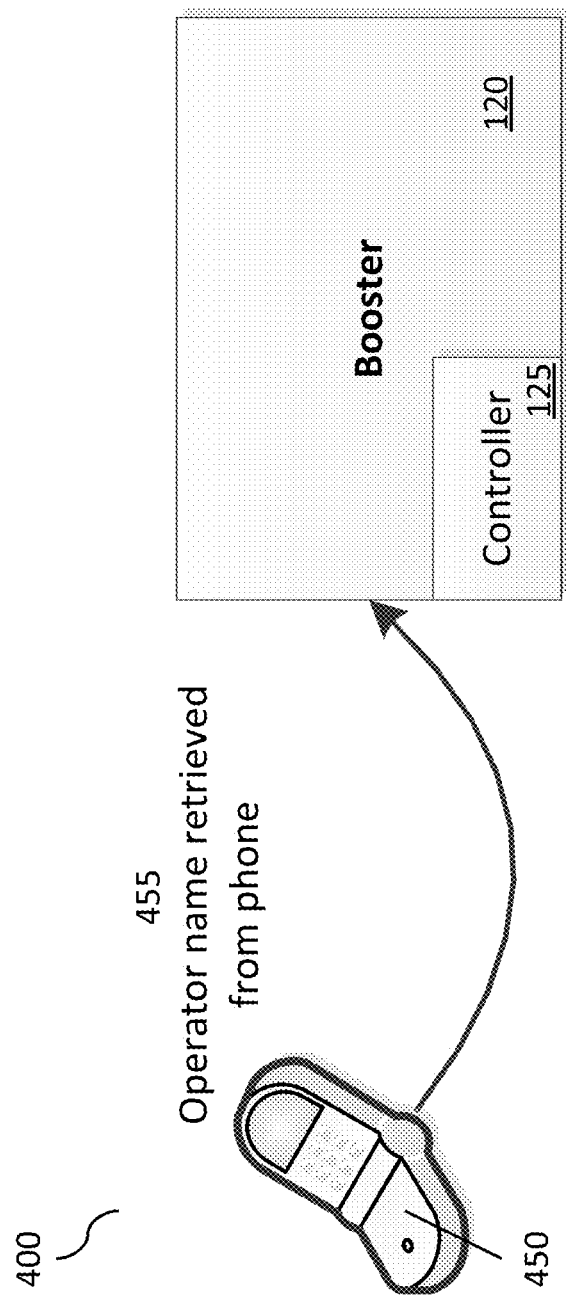
FIG. 4 illustrates retrieving an operator name from an external device, in accordance with implementations described herein.

FIG. 4 illustrates a system and method 400 where the booster 120 interrogates 455 an external device 450 to retrieve its required configuration. The controller 125 on the booster 120 can interrogate the external device 450 and in turn retrieve an operator name 455 from the external device (e.g. mobile phone, hand held mobile device). The controller 125 can use the operator name to obtain configuration information. The configuration information can be stored on the booster itself 120 or the information can be stored externally, such as in a computing cloud as shown in FIG. 3. Once the controller 125 has the configuration information, the booster 120 can be made to conform to the configuration parameters for the operator associated with the external device.

In alternative implementations, the name of the required network is retrieved from an external device and where the configuration is then retrieved either from local storage on the booster or from a remote location, such as a storage cloud.

In yet other implementations, the name of the operator is periodically retrieved from a connected device to ensure that the correct network is always boosted. For example, if the booster is in a car, the booster may travel across an international boundary, causing the phone to go into roaming mode and requiring the booster to automatically reconfigure itself for the new network onto which the phone has roamed.

Figure 5:
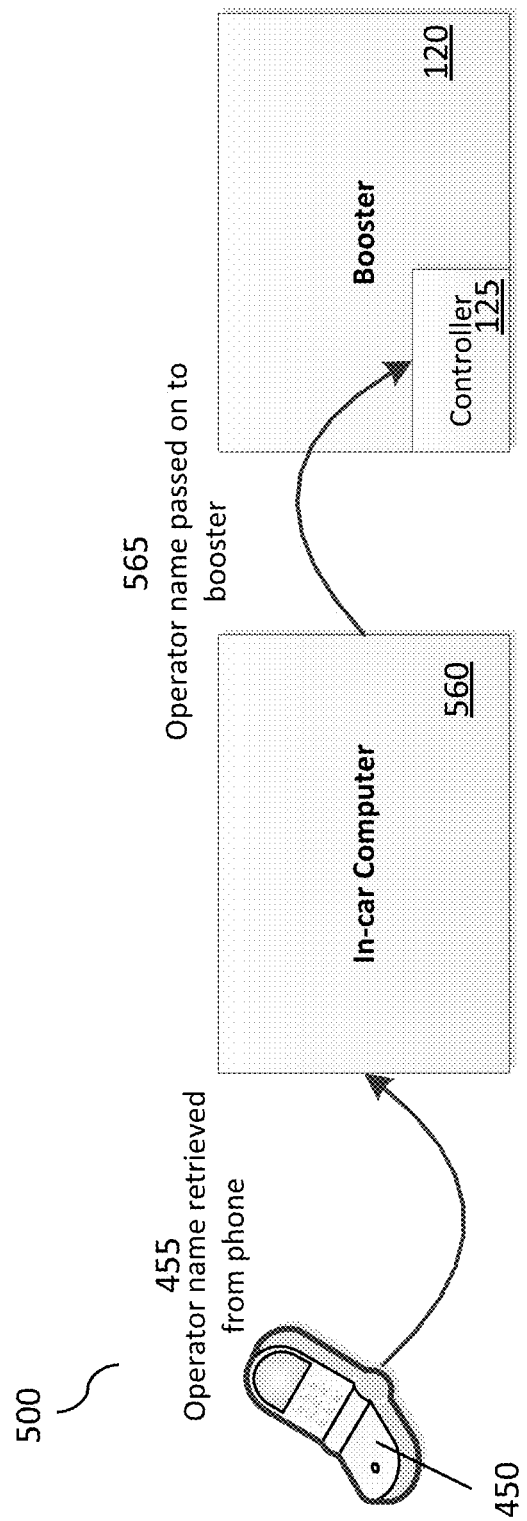
FIG. 5 illustrates multi-stage retrieval of booster configurations, in accordance with implementations described herein.

FIG. 5 illustrates a multi-stage information retrieval process 500 where more than one step is needed to retrieve the network name. For example, the booster 120 may be installed in a car and the driver's phone 450 is synched with an in-car computer 560. When the phone 450 syncs with the in-car computer 560, the operator name can be retrieved 455 from the phone 450. The controller 125 associated with the booster 120 can then retrieve 565 the name of the operator to be boosted from the in-car computer 560 which in turn retrieves this information from the phone 450.

In accordance with a third set of implementations, a sub-configuration can be retrieved. Under some conditions, for example when a booster is directly connected to a M2M (machine to machine) module, it is not required to boost all the frequencies of an operator. In this case, in addition to retrieving the operator name and configuration of the booster, a sub configuration can be retrieved to allow the booster to only boost the frequencies actually in use by the M2M module as opposed to all the frequencies on which the operator's signal is broadcasted. What is unique about this method is as follows.

Figure 6:
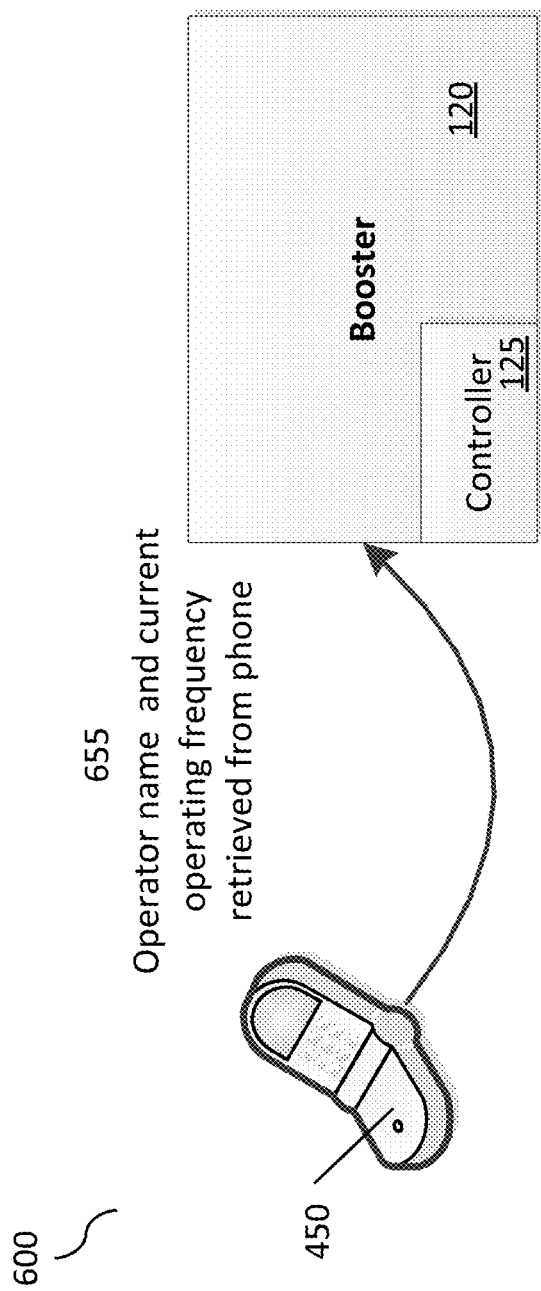
FIG. 6 illustrates retrieving a sub-configuration from an external device, in accordance with implementations described herein.

FIG. 6 illustrates a system and method 600 where the actual frequencies being used by any cellphone 450 connected to the booster 120 are retrieved 655, along with the operator name, by the controller 125. The booster 120 is then configured to boost only those frequencies.

In alternative implementations, there is interaction between the phone and the booster so that the booster is informed whenever the phone changes the frequency it is using. Such interaction could be via a wired (e.g. USB or RS-232) or wireless connection (e.g. Bluetooth).

Although a few embodiments have been described in detail above, other modifications are possible. Other embodiments may be within the scope of the following claims.

What is claimed is:

1. A system comprising:
   a booster comprising a controller for implementing a configuration associated with an operator on the booster; and
   an interface including a display and a memory storing a list of operators, the interface configured to present the list of operators on the display, wherein upon selection by a user of one of the operators, the configuration associated with the user selected operator is transferred to the controller which automatically configures the booster for operation on a network of the user selected operator.

2. The system in accordance with claim 1, wherein the operator includes a name.

3. The system of claim 1, wherein the booster includes the interface.

4. The system of claim 1, wherein the interface is an application executing on a handset connected to the booster.

5. The system of claim 1, wherein the interface is an application connected to a website.

6. The system of claim 1, wherein the memory stores the booster configuration information associated with the user selected operator and the controller retrieves the configuration associated with the user selected operator from the memory.

7. The system of claim 1, wherein the booster includes a database of operator configurations, wherein the controller retrieves the configuration associated with the user selected operator from the database.

8. A system comprising:
   a booster comprising a controller for implementing a configuration associated with an operator on the booster;
   an external device including a memory storing a list of operators and booster configurations; and
   an interface including a display, the interface configured to present the list of operators on the display, wherein upon selection by a user of one of the operators the interface sends the selected one of the operators to the controller and the controller retrieves a booster configuration associated with the selected operator from the external device, wherein the controller causes the booster to conform to the configuration associated with the operator.

9. The system in accordance with claim 8, wherein the operator includes a name.

10. The system of claim 8, wherein the booster includes the interface.

11. The system of claim 8, wherein the interface is an application executing on a handset connected to the booster.

12. The system of claim 8, wherein the interface is an application connected to a website.

13. The system of claim 8, wherein the external device is a computer connected to the booster or a database located in a cloud.

14. A method comprising:
   receiving, at a wireless signal booster, wireless signals from two or more mobile phone operators;
   interrogating, by the wireless signal booster, a mobile device to retrieve an operator, the mobile device connected to the wireless signal booster using a first wireless communication connection, the mobile device connected to a network associated with the operator using the second wireless communication, wherein the mobile device provides the operator of the network in response to interrogation by the wireless signal booster;
   selecting, based on the retrieved operator, one selected operator from the two or more mobile phone operators; and
   selectively boosting, by the wireless signal booster, the wireless signals from the selected operator, the selectively boosting repeating the wireless signals from the selected operator in a boosted state for a mobile phone recipient.

15. The method in accordance with claim 14, wherein the operator includes a name.

16. The method of claim 14, further comprising:
   retrieving a booster configuration information from a memory storing booster configuration information for at least two operators.

17. The method of claim 16, wherein the booster includes the memory.

18. The method of claim 16, wherein the memory is at a location remote from the booster.

19. The method of claim 16, wherein the mobile device includes the memory.

20. The method of claim 14, wherein the wireless signal booster periodically retrieves the operator from the mobile device.

* * * * *